United States Patent
Vahl

[11] 3,901,044
[45] Aug. 26, 1975

[54] PREPARATION OF SOLID CARBON DIOXIDE

[76] Inventor: Laszlo Vahl, Charlotte de Bourbonstraat 22, Delft, Netherlands

[22] Filed: Apr. 24, 1974

[21] Appl. No.: 463,550

Related U.S. Application Data

[63] Continuation of Ser. No. 135,060, April 19, 1971, abandoned.

[30] Foreign Application Priority Data

Apr. 17, 1970 Netherlands .................... 7005727

[52] U.S. Cl. ........................................ 62/10; 62/35
[51] Int. Cl. ............................................ F25j 1/00
[58] Field of Search ................. 62/8, 10, 35, 12

[56] References Cited
UNITED STATES PATENTS

| | | | |
|---|---|---|---|
| 1,968,318 | 4/1934 | Seligman | 62/10 |
| 1,974,681 | 9/1934 | Maiuri | 62/35 |
| 2,016,815 | 10/1935 | Gilmore | 62/10 |
| 2,138,758 | 11/1938 | Eastman | 62/10 |

FOREIGN PATENTS OR APPLICATIONS

| | | | |
|---|---|---|---|
| 694,506 | 9/1935 | France | 62/10 |
| 404,833 | 10/1935 | United Kingdom | 62/10 |

Primary Examiner—Norman Yudkoff
Assistant Examiner—Frank Sever
Attorney, Agent, or Firm—John P. Snyder

[57] ABSTRACT

A process for the preparation of solid carbon dioxide by freezing liquid carbon dioxide in a closable refrigerated vessel wherein the vessel is closed when it contains such an amount of liquid carbon dioxide in excess of the amount corresponding with the contents of the refrigerated part, that the freezing of the liquid carbon dioxide takes place without the presence of the gaseous phase, the refrigerated wall is kept at a temperature lower than the triple temperature but higher than the sublimation temperature of carbon dioxide at atmospheric pressure and after the carbon dioxide has completely solidified the solid carbon dioxide is removed.

8 Claims, 1 Drawing Figure

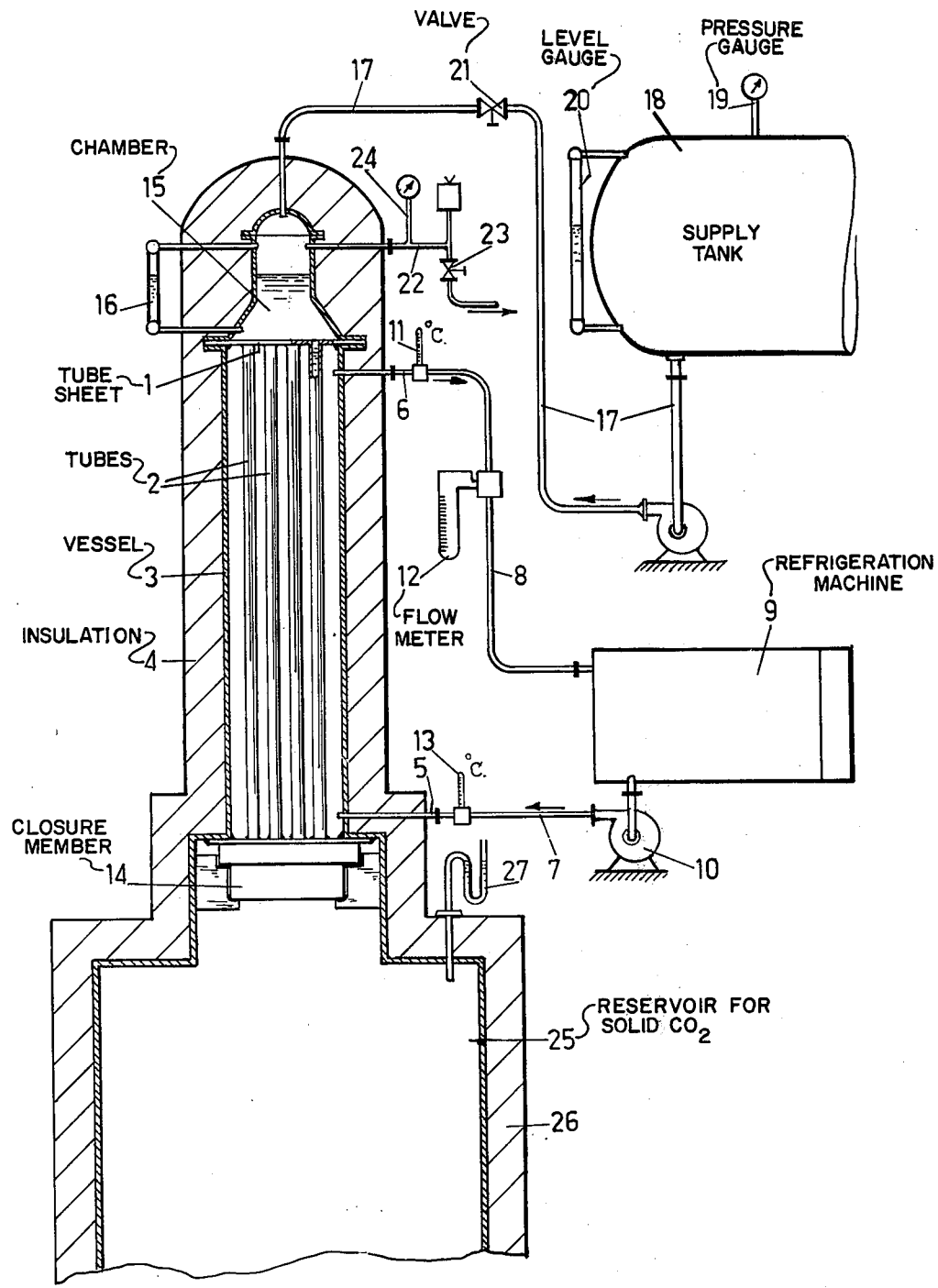

PREPARATION OF SOLID CARBON DIOXIDE

This application is a continuation of application Ser. No. 135,060, filed Apr. 19, 1971 and now abandoned.

The invention relates to a process for the preparation of solid carbon dioxide by freezing liquid carbon dioxide. The processes hitherto applied on an industrial scale are intended to produce blocks of solid carbon dioxide in standard sizes. These blocks are packed as piece goods and can be stored and transported in storage containers. Production starts with purified gaseous carbon dioxide which is liquified. Expansion of the liquid results in the formation of dry ice in the form of snow which can be pressed in moulds to form a fine crystalline block. The blocks of carbon dioxide produced in this way have the mechanical properties required for their subsequent use. The specific gravity of these blocks however, is lower than is theoretically possible. This us due to the fine-crystalline structure of the solid carbon dioxide occurring as a result of the process used.

A summary of known processes is given in Kuprianoff's book "Die feste Kohlensaeure, Herstellung und Verwendung", 1953. The great disadvantage of the know processes is that the process used is quite irreversible, since approximately half the liquid carbon dioxide evaporates on expansion, so that this evaporated carbon dioxide must recirculate via compressors and a condensation system. This results in high power costs per ton of product. Another disadvantage is that mechanically driven presses have to be used.

As is described in the U.S. Pat. No. 2,084,403 also an attempt has already been made to prepare solid carbon dioxide by freezing liquid carbon dioxide whereby the liquid carbon dioxide is placed in a closable vessel provided with means for refrigerating at least part of the contents of the vessel by a supply of refrigerating medium. In applying this known process in the refrigerated vessel at the same time gaseous carbon dioxide is condensed and liquid carbon dioxide is frozen at the same time. As a result of the presence of the gaseous phase during the freezing of the liquid carbon dioxide one does not obtain however, solid carbon dioxide of a high specific gravity. As a matter of fact in the vessel is also formed snow and white-frost.

The object of the invention is to provide such a process which does not have the above disadvantages and which also has additional advantages. According to the invention the vessel is closed when it contains such an amount of liquid carbon dioxide in excess of the amount corresponding with the contents of the refrigerated part of the vessel, as is required to keep the refrigerated part completely filled during the solidifying of the liquid carbon dioxide and to keep the level of the solid carbon dioxide at most equal with the upper edge of the refrigerated part at the end of the freezing cycle, such that the freezing of the liquid carbon dioxide takes place without the presence of the gaseous phase, the refrigerated wall is kept — by means of the refrigerating means — at a temperature lower than the triple temperature of the carbon dioxide but higher than the sublimation temperature of carbon dioxide at atmospheric pressure, and when the liquid carbon dioxide has completely solidified the pressure in the vessel is reduced to atmospheric pressure, while the supply of refrigerating medium is maintained, where after the solid carbon dioxide is removed. When such a process is used, owing to the supply of the amount of liquid carbon dioxide in excess as mentioned, the refrigerated part of the vessel is completely filled with liquid carbon dioxide during the whole cycle and at the end of the freezing cycle as a result of the shrinkage the level of the solid carbon dioxide is slightly below the upper edge of the refrigerated part, so that the freezing takes place without the presence of the gaseous phase, whereas the solid carbon dioxide can be readily released. The amount of liquid carbon dioxide mentioned of course depends on the pressure and the temperature of the liquid carbon dioxide supplied. Preferably the extra amount of liquid carbon dioxide corresponds with 40% by volume of the contents of the refrigerated part of the vessel, because then in that case the result aimed at is obtained with a filling pressure of the liquid carbon dioxide of 20 atmospheres guage. This is the usual pressure for storing liquid carbon dioxide. This pressure and the corresponding equilibrium temperature can be maintained with compressor refrigerating machines of simple construction.

The product obtained needs not be pressed since a coarse crystalline structure is obtained for the product, the specific gravity approaching the theoretical value. Another advantage is that no special precautions are required to make the product available in a form suitable for the storage and transportation of solid carbon dioxide in the form of bulk goods. When this is considered desirable in view of the user's requirement the resulting product can be pressed into the form of large blocks without appreciable losses occurring.

Further in view of the above mentioned processes, in which blocks of carbon dioxide are prepared via the snowphase by expanding liquid carbon dioxide to a pressure lower than the critical pressure, the advantage is that the amount of gaseous carbon dioxide which must recirculate has been reduced to a minimum. Instead of the irreversible expansion of the liquid one has to do with the freezing of liquid. As the process according to the invention is much less irreversible than the known processes, the power costs per ton of product are much lower.

According to the invention after the complete quantity of liquid carbon dioxide has solidified, the pressure is reduced by continued refrigeration of the resulting solid carbon dioxide to a pressure associated with a carbon dioxide temperature differing only slightly from that of the refrigerating medium, then the pressure is slowly reduced until atmospheric or substantially atmospheric pressure and next the solid carbon dioxide is removed. A process of this type enables the solid carbon dioxide to be very readily released from the vessel.

According to the invention, if required, during the filling of the vessel the temperature of the refrigerating medium is allowed to rise from a minimum value to a maximum value and after the filling of the vessel with liquid carbon dioxide the temperature is again gradually decreased — from the beginning of the freezing cycle to the end thereof — from the maximum value to the minimum value.

According to the invention if required the solid carbon dioxide is brought from the vessel directly into a chamber containing carbon dioxide atmosphere. This can be achieved, for example, by disposing the vessel above a silo, sudden cooling of the solid carbon dioxide due to its coming into an air atmosphere being avoided.

According to the invention, if required, the solid carbon dioxide is removed from the vessel after temperature equalisation has been established in the solid carbon dioxide. This is important particularly when the resulting pieces of solid carbon dioxide are to be mechanically comminuted. As a result of the temperature equalisation, there are no longer any appreciable internal stresses in the solid carbon dioxide.

Finally, if required, according to the invention the temperature of the refrigerating medium in the bottom part of the freezing vessel is at least 1° lower than near the top end of the refrigerated part. This step provides control of the direction in which solidification of the liquid carbon dioxide occurs.

The invention also relates to apparatus for performing one or more of the above-described processes. According to the invention, if required, the freezing vessel is formed by a vertical pipe bundle provided with means for supplying and discharging refrigerating medium around the pipes, the top of the pipe bundle is connected to a chamber provided with means for selectively supplying liquid carbon dioxide and means for selectively decreasing the pressure, said chamber having a capacity equal to at least 40% of the volume of the space within the pipe bundle, means are provided for determining the amount of liquid carbon dioxide supplied in said chamber and the bottom of the pipe bundle is provided with means for selectively closing or releasing the openings of the pipe bundle. The process can be applied very simply with such apparatus. Since the extra chamber above the pipe bundle has a volume of at least 40% of the contents of the pipe bundle, as already has been elucidated, it can be made use of liquid carbon dioxide of the usual pressure of 20 atmosphers gauge. The solid carbon dioxide can readily be released from the pipe bundle by gravity. By the use of long pipes, the solid carbon dioxide is obtained in the form of rods which either break themselves or are readily broken into pieces of the required size by means of a mechanical device. The length/diameter ratio of the pipes may, for example, be 100 in a specific case. This ratio will, however, always be greater than 20. In one advantageous embodiment of the apparatus according to the invention, the pipe bundle is disposed on a reservoir for solid carbon dioxide so that when the means for closing the bottom ends of the pipes release the openings of the pipe the latter discharge into the reservoir. When the solid carbon dioxide is released, it then drops directly into the reservoir, immediately passing into a carbon dioxide atmosphere.

The invention finally also relates to small pieces of solid carbon dioxide prepared by use of one or more of the above processes. The small pieces can be treated as bulk goods. They have a coarse-crystalline structure and are transparent.

The invention will be explained in detail in the following description of apparatus for the preparation of solid carbon dioxide with reference to the drawing.

The freezing vessel is formed by a bundle 1 of pipes 2. The pipe bundle 1 is disposed in a vessel 3 enclosed by a layer 4 of insulation. The vessel 3 has a connection 5 at the bottom and a connection 6 at the top. Conduits 7 and 8 are connected to the connections 5 and 6. Refrigerating medium is fed to the conduit 7 from a refrigerating machine 9 by means of a pump 10 and after flowing through the vessel 3 and exerting a refrigerating effect on the pipes 2 returns to the machine 9 via the conduit 8. The latter contains a thermometer 11 and a flow-meter 12, while conduit 7 contains a thermometer 13. The amount of refrigerating liquid can be kept at a required value by means of the flowmeter 12. The pipes 2 of the bundle 1 are closed at the bottom by means of a closure member 14. At the top the pipes 2 discharge into a liquid chamber 15 provided with a level gauge 16, so that the height of the level of liquid in the chamber 15 can be read off. A conduit 17 leads into the top of the chamber 15 and is connected at the other end to a supply tank 18 for liquid carbon dioxide. The supply tank is provided with a pressure guage 19 and a level gauge 20. A pump (not shown in detail) may be provided in the conduit 17. The connection between the tank 18 and the chamber 15 can be established or shut off by means of a valve 21. A conduit 22 is also connected to the chamber 15 and can be connected to atmosphere by means of a valve 23. Conduit 22 is provided with a pressure gauge so that the pressure in the chamber 15 can be read off. A safety valve (not shown in detail) connects the conduit 22 and hence the chamber 15 to atmosphere when the pressure in the chamber 16 rises above a given maximum value. The botton end of the pipe bundle 1 is connected to a reservoir 25 for solid carbon dioxide. The wall of the reservoir 25 is also provided with a layer on insulating material 26. The interior of the reservoir 25 communicates with atmosphere via a liquid lock in a conduit 27. A small excess pressure can be maintained in the reservoir 25 by means of the liquid lock.

The apparatus operates as follows. Liquid carbon dioxide is stored in the tank 18, for example at a pressure of 20 atmospheres gauge. At the beginning of the cycle, the pipes 2 of the bundle 1 are filled with carbon dioxide gas at atmospheric pressure left over from a preceding cycle. Liquid carbon dioxide is fed by the pump via the conduit 17 and the valve 21 to the chamber 15 the pipes 2 first being filled. At the bottom the pipes are closed by means of the member 14. The pipes 2 are completely filled and the chamber 15 is filled until there is 40% liquid carbon dioxide more present than corresponds to the capacity of the pipes 2. The valve 21 is then closed. During filling of the pipes 2 and chamber 15, refrigerating liquid circulates around the pipes 2 via the pipes 7 and 8. The temperature of the refrigerating liquid in the conduit 7 is −70°C, for example. The amount of refrigerating liquid is kept at an exact predetermined value by means of the liquid guage 12. The pressure in the chamber 15 is checked by means of the meter 24 and kept at a value between the triple pressure and the filling pressure. If the insulating jacket insulates sufficiently, the pressure can be kept at the required value without any extra precautions being necessary. This pressure is dependent upon the heat radiation to the non-cooled part above the pipes 2.

An extra refrigerating system for the chamber 15 can be provided, if necessary, to compensate for the heat radiation.

After a given time, all the liquid carbon dioxide will be solidified, the level in the chamber 15 having dropped to below the top edge of the pipes 2. The pressure drop in the chamber 15 can be read off from the guage 24 and shows that all the carbon dioxide has solidified. The pressure on the guage 23 will drop below the triple pressure.

Refrigeration of the pipes 2 is continued so that the solid carbon dioxide is refrigerated still further, and this will be apparent from further drop in the pressure in the chamber 15.

When such pressure in chamber 15 has dropped to such an extent that the equilibrium pressure associated with the refrigerating medium temperature (i.e. −70° in this case) has almost been reached, the valve 23 is opened so that the pressure in the chamber 15 gradually drops until atmospheric pressure has been reached. If the openings of the pipes are then released by means of the member 14, the rods of solid carbon dioxide that are formed will slide down out of the pipes 2 by gravity into the reservoir 25. A breaking device can be provided if necessary to break the rods into pieces of the required length. The next cycle can start when the pipes have been closed again by means of the member 14.

The process and apparatus described are particularly suitable for automation of the preparation of solid carbon dioxide. In dependance of the level of liquid carbon dioxide in the freezing vessel the completion of the filling and the starting of the freezing cycle can be controlled. In dependence of the pressure at the top of the freezing vessel the termination of the freezing cycle and the start of the removal of the solid carbon dioxide can be controlled. The apparatus can then operate automatically continuously until the reservoir 25 has been completely filled.

Opening of the pipes by means of the member 14 can be delayed, for example, for some time until the pressure in the chamber 15 has dropped to atmospheric pressure. A temperature can then be established within the rod of carbon dioxide first. This minimises the occurrence of cracks in the carbon dioxide and this is very important when the rod is broken into pieces by a breaking device.

What I claim is:

1. A process of making solid carbon dioxide which comprises the steps of:
   a. feeding, so as to partially fill a space with a batch of liquid carbon dioxide at a pressure in substantial excess of the triple point pressure of carbon dioxide;
   b. sealing off said partially filled space to form a confined space partially filled with liquid carbon dioxide at a pressure between the triple point pressure of carbon dioxide and the feed pressure of step (a); said confined space consisting substantially of a first region in the form of a plurality of vertical elongate tubes; said first region having a sufficient volume to contain the entire said batch of carbon dioxide when said batch of carbon dioxide is solidified; said confined space further consisting of a second region which surrmounts said first region; said second region being in the form of a reservoir; said second region having a volume no less than 40% of the volume of said first region;
   c. cooling said first region alone, by indirect heat exchange with a refrigerant, to maintain said first region at a temperature between the triple point temperature of carbon dioxide and the sublimation temperature of carbon dioxide at atmospheric pressure, so as to produce solid carbon dioxide in said first region;
   d. reducing the pressure within said confined space substantially to atmospheric pressure, while continuing said cooling step (c), and;
   e. discharging, solidified carbon dioxide from said first region.

2. A process according to claim 1 wherein the quantity of liquid carbon dioxide contained in said second region is substantially equal to 40% of said predetermined volume contained in said first region.

3. A process according to claim 1 wherein step (c) is effected by circulating refrigerant over the exterior surfaces of said first region.

4. A process according to claim 1 wherein step (c) is effected so as to maintain a temperature gradient of positive slope within the entire vertical length of said first region.

5. A process according to claim 4 wherein said temperature gradient is in the order of 1°C.

6. A process according to claim 1, characterised in that during step (a) the temperature of the refrigerant is increased from a minimum value to a maximum value and during step (c) the temperature is gradually decreased - from the beginning of the freezing cycle to the end the freezing cycle - from said maximum value to said minimum value.

7. Apparatus for producing solid carbon dioxide having a density approaching the highest theoretically attainable value of solid carbon dioxide, comprising in combination:
   a vessel having an enclosed upper part defining a reservoir space and a lower part in the form of a plurality of vertically elongate tubes;
   means for selectively closing the lowest vertical ends of said tubes whereby the interior of said vessel is isolated from surrounding atmosphere;
   means surrounding said tubes for defining a refrigerant recirculation chamber
   means leading into said upper part of the vessel for selectively introducing a volume of liquid carbon dioxide under superatmospheric pressure into said vessel so as to fill said tubes and substantially all of said upper part of the vessel, said upper part of the vessel being of a volume which is about 40% of the volume of said tubes and said volume of liquid carbon dioxide being in the order of 1.4 times the volume of said tubes;
   means for selectively circulating refrigerant through said refrigerant recirculation chamber for maintaining the walls of said tubes at a temperature between the triple point temperature of carbon dioxide and the sublimation temperature of carbon dioxide at atmospheric pressure; and
   valve means for reducing the pressure in said vessel to atmospheric pressure after the entire said volume of liquid carbon dioxide is solidified and contained within said tubes.

8. Apparatus according to claim 7 including a silo communicating, through said means for closing, with the lower ends of said tubes whereby to receive solidified carbon dioxide within a carbon dioxide atmosphere.

* * * * *